(No Model.)
E. THOMSON.
LIGHTNING ARRESTER.
No. 454,671. Patented June 23, 1891.
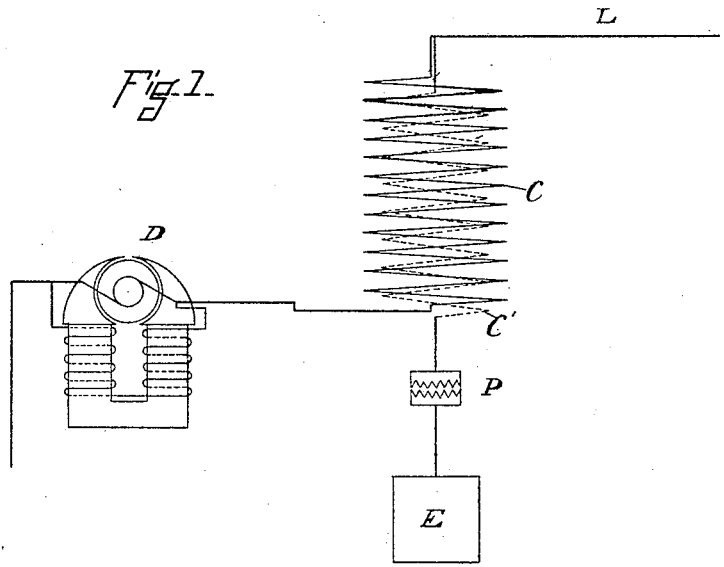
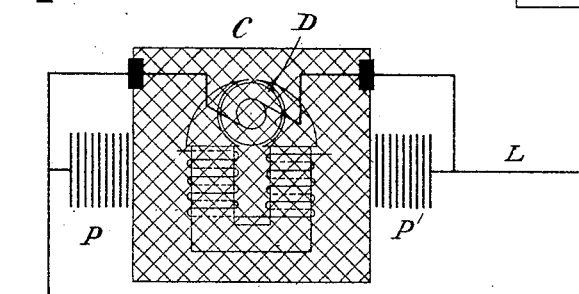
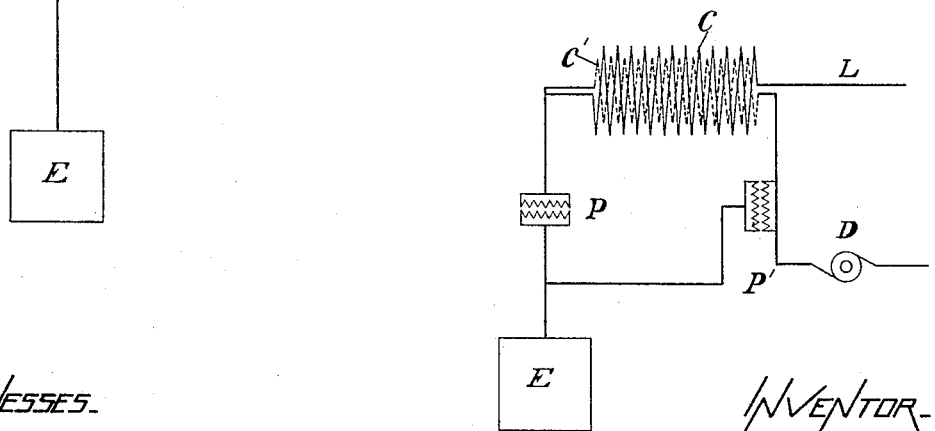
WITNESSES
S. B. Thompson
A. F. Macdonald
INVENTOR
Elihu Thomson
by Birtley & Knight
Attys.

UNITED STATES PATENT OFFICE.

ELIHU THOMSON, OF SWAMPSCOTT, MASSACHUSETTS.

LIGHTNING-ARRESTER.

SPECIFICATION forming part of Letters Patent No. 454,671, dated June 23, 1891.

Application filed October 30, 1890. Serial No. 369,818. (No model.)

*To all whom it may concern:*

Be it known that I, ELIHU THOMSON, a citizen of the United States, residing at Swampscott, county of Essex, and State of Massachusetts, have invented a certain new and useful Improvement in Lightning-Arresters, of which the following is a specification.

My present invention is designed to supplement the action of the ordinary lightning-arrester in protecting a dynamo-electric generator, motor, or other apparatus included in an electric circuit from lightning or other high potential discharges. To this end I have devised a new method and apparatus for the above purpose, which consists, briefly, in causing the lightning discharge when passing to earth to generate by induction a counter electro-motive force opposing the passage of the discharge through the generator or other apparatus to be protected, and thus effectually prevent injury thereto.

The accompanying drawings illustrate, diagrammatically, various forms of my invention, in which—

Figures 1, 2, and 3 illustrate, respectively, modifications identical in principle but differing in matters of detail, as will be hereinafter explained.

In the views, L represents a line-circuit, in which is located a dynamo-electric generator D, supplying current to the circuit; but while this dynamo is selected herein for purposes of illustration, as that is the machine I have had more particularly in view, it will be understood that it may be replaced by other forms of apparatus which are to be protected from lightning.

My system of protection is, moreover, applicable to all systems of distribution of electric currents, whether direct or alternating, and the dynamo D may therefore be considered as either a direct or an alternating current generator. The line-wire L is connected to ground at one end of the circuit, and at the other end there are two conducting paths to ground, one the ordinary lightning-discharge path shunting the generator by way of arrester-plates P and ground-plate E and including also a few turns of wire C', while the second comprises a corresponding coil C, which may be interior or exterior to the coil C' and passes through the generator to ground. The two coils C C' are arranged in inductive relation to one another, but are well insulated. Their effect is to cause a lightning or other static discharge when passing directly to ground through the path of comparatively low self-induction and coil C' to generate an opposing counter electro-motive force from the generator to the line in the other coil C, and in this way to balance the inductive effects.

In Fig. 2 the coil C in the direct lightning-discharge path is, in effect, an exterior casing or basket-work of metal, which surrounds the dynamo, while the windings of the machine itself serve as the second coil, corresponding to C in Fig. 1. The connection from the line L and earth-plate E to the casing C may be made either directly or through a series of insulated plates P P', which are separated by a small interval, enabling a static discharge to pass throughout the series. In case a direct connection to the casing is made, an arc-rupturing lightning-arrester would be interposed in the ground connection between the cage and earth-plate E; but if the insulated plates P P' be used an arc will not be maintained between individual plates on account of the number of spark-gaps in series. In this form of my invention the passage of an inductive discharge from the line by way of the cage C, shunting the generator, will set up a counter-induction effect in the windings of the dynamo itself, and these two will oppose one another, so that the dynamo will be thoroughly protected.

In Fig. 3 a still further modification of the invention is shown, in which the dynamo is connected to line through the two coils in series, and here it is the interior coil C', which is connected directly to the dynamo and is shunted by the ground connection through the coil C, arrester-plates P, and earth-plate E. The lightning will be more apt to traverse the coil C, as this is the exterior one, and pass directly to earth, while in doing so it generates a counter electro-motive force in the coil C', protecting the generator D, as before. In this modification a second set of arrester-plates P' is provided, which form a shunt for the coil C' around the dynamo, and whose object is to cut off from the dynamo any excessive induced discharge which might be generated in the coil C' by a vigorous discharge to earth through the direct conducting path. In this way a static discharge toward the dynamo in opposition to the original discharge when too great will pass to the ground through the arrester-plates P'.

No definite instructions need be given for proportioning the windings C C'. In some cases the number of turns would be the same. In others the coil in the dynamo branch would have a few more turns than the other, and good results can sometimes be obtained with double the number of turns, so as to give an excess of counter electro-motive force in this branch and obviate the possibility of any current reaching the dynamo or other protected apparatus. The number of turns will of course be understood to vary according to the size, character, and relation of the coils one to the other, and can be determined by experiment for each case. In any case, however, the two windings should be so related that a discharge coming from the line and passing through the ground-winding induces in the line-winding an electro-motive force opposite to that which the discharge itself produces therein. This condition is fulfilled by winding the coils or choosing the connections, so that the two windings pass around the coils in the same direction, starting in each case from that end which is nearer the line. These windings may be designated as "electro-magnetic induction devices."

As indicated above, this invention may be worked out in a number of modified ways; but as I am the first, so far as known, to cause the discharge in passing through the ground branch to generate a counter electro-motive force in the main line, and to utilize this counter electro-motive force as an additional precaution against injury to the apparatus protected by the lightning-arrester, my intention is to claim the same, broadly, irrespective of modifications in the specific ways the invention may be used. Thus, while I have attained the desired result by means of electro-magnetic induction, it is obvious that my invention is not limited to this kind of induction, as it may be carried out by the well-recognized equivalents therefor.

I do not herein claim the method involved in the operation of this apparatus, as the same is claimed in a division of this application filed March 26, 1891, Serial No. 386,558.

What I claim as new, and desire to secure by Letters Patent, is—

1. The combination, with an electric-line circuit including an apparatus to be protected, of a lightning-discharge path from the line-circuit, shunting such apparatus and electro-responsive means respectively in such line-circuit and shunt and arranged in inductive relation to one another, so that the passage of the discharge through the shunt means generates a counter electro-motive force in the line-circuit means, opposing the passage of the discharge through the aforesaid apparatus to be protected.

2. The combination, with an electric-line circuit including an apparatus to be protected, of a lightning-discharge path from the line-circuit, shunting such apparatus and inductive devices respectively in such line-circuit and shunt and arranged in inductive relation to one another, so that the passage of the discharge through the shunt device generates a counter electro-motive force in the line-circuit device, opposing the passage of the discharge through the aforesaid apparatus to be protected.

3. The combination, with a line-circuit, of two conducting paths therefrom to ground, one shunting and the other including a dynamo-electric generator, motor, or other apparatus to be protected and arranged in inductive relation to one another, so that the passage of the discharge through the path leading directly to ground generates a counter electro-motive force in the path through the dynamo, opposing the passage of the discharge in said second path.

4. The combination, with a dynamo-electric generator or other apparatus included in an electric circuit, of a lightning-discharge path from the line-circuit to ground, shunting said generator and coils respectively in such line-circuit and the shunt to ground and arranged in inductive relation to one another, so that the passage of the discharge through the ground-shunt coils generates a counter electro-motive force in the line-circuit coils, opposing the passage of the discharge through the generator or other apparatus to be protected.

5. The combination, with a dynamo-electric generator or other apparatus to be protected and a lightning-discharge path shunting the same, of the coils respectively in the circuit of the dynamo and the discharge path and arranged in inductive relation to one another, so that on the passage of a discharge through the discharge-path coil a counter electro-motive force is generated in the other coil, opposing the passage of the discharge through the apparatus to be protected, and a second lightning-discharge path forming a shunt for the coil in which the opposing counter electro-motive force is generated.

6. The combination, with a dynamo-electric generator or other apparatus included in an electric circuit, of a lightning-discharge path from the line-circuit to ground, shunting said generator and electro-magnetic devices respectively in such line-circuit and the shunt to ground and arranged in inductive relation to one another, so that the passage of the discharge through the ground-shunt device generates a counter electro-motive force in the line-circuit device, opposing the passage of the discharge through the generator or other apparatus to be protected.

7. In a lightning-arrester, the combination of a line-circuit and a generator of electro-motive force in or capable of being thrown into said line, with a discharge path from the line shunting the apparatus which it is desired to protect, containing electro-responsive means responding to the passage of a discharge over the shunt and thereupon introducing an electro-motive force in the line, opposing the passage of the discharge through the apparatus to be protected.

In testimony whereof I have hereto set my hand this 27th day of October, 1890.

ELIHU THOMSON.

Witnesses:
JOHN W. GIBBONEY,
JOHN T. BRODERICK.